(12) United States Patent
Nanduru et al.

(10) Patent No.: US 12,047,254 B2
(45) Date of Patent: Jul. 23, 2024

(54) RISK MITIGATION IN SERVICE LEVEL AGREEMENTS

(71) Applicant: Kyndryl, Inc., New York, NY (US)

(72) Inventors: Laxmikantha Sai Nanduru, R K Puram Post (IN); Jigar Kapasi, Sanjaynagar (IN); Pritpal S. Arora, Bangalore (IN); Sathis Kumar Duraisamy, Chennai (IN)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 17/891,411

(22) Filed: Aug. 19, 2022

(65) Prior Publication Data

US 2024/0064068 A1    Feb. 22, 2024

(51) Int. Cl.
 *H04L 41/5006* (2022.01)
 *H04L 41/5009* (2022.01)

(52) U.S. Cl.
 CPC ...... *H04L 41/5006* (2013.01); *H04L 41/5009* (2013.01)

(58) Field of Classification Search
 CPC .................. H04L 41/5006; H04L 41/5009
 See application file for complete search history.

(56) References Cited

U.S. PATENT DOCUMENTS

| | | |
|---|---|---|
| 7,313,533 B2 | 12/2007 | Chang et al. |
| 11,223,538 B1* | 1/2022 | Arumugam ............. H04L 45/26 |
| 2007/0083650 A1* | 4/2007 | Collomb ................ G06Q 10/04 709/224 |
| 2010/0280861 A1* | 11/2010 | Rossen .............. G06Q 10/0635 705/7.39 |
| 2015/0207696 A1* | 7/2015 | Zhang ................. H04L 41/5009 709/224 |

(Continued)

FOREIGN PATENT DOCUMENTS

| | | |
|---|---|---|
| CN | 103226539 | 7/2013 |
| JP | 4939594 | 5/2012 |

OTHER PUBLICATIONS

Mell et al., "The NIST Definition of Cloud Computing", NIST, Special Publication 800-145, Sep. 2011, 7 pages.

(Continued)

*Primary Examiner* — Joe Chacko
(74) *Attorney, Agent, or Firm* — Dan Housley; Rupam Bhar; Calderon Safran & Wright P.C.

(57) ABSTRACT

A method of mitigating risks in a service level agreement (SLA), including: identifying relationships between an infrastructure and an application associated with the SLA; identifying changes to a technological environment of the SLA based on collected data associated with the SLA and the identified relationships, the collected data including the infrastructure and the application; establishing a baseline for a service level objective (SLO) of the SLA by analyzing the collected data of the infrastructure and the application; determining risk impact to the SLA based on an assessment of requirements to the SLO and the changes to the technological environment of the SLA; generating a solution option for the SLA by applying an explainable artificial intelligence (XAI) model based on processing the risk impact with the baseline in the XAI model; and updating the SLA based on the solution option.

20 Claims, 7 Drawing Sheets

(56) References Cited

U.S. PATENT DOCUMENTS

| | | | |
|---|---|---|---|
| 2017/0149627 A1 | 5/2017 | Blondeau et al. | |
| 2018/0115463 A1* | 4/2018 | Sinha | H04L 41/5067 |
| 2019/0130327 A1* | 5/2019 | Carpenter | G06F 9/45558 |
| 2020/0136920 A1 | 4/2020 | Doshi et al. | |
| 2020/0145337 A1 | 5/2020 | Keating et al. | |
| 2020/0226510 A1* | 7/2020 | Gupta | G06Q 50/18 |
| 2022/0329499 A1* | 10/2022 | Smith | H04L 41/5006 |
| 2023/0082903 A1* | 3/2023 | Subrahmaniam | H04L 41/5009 709/224 |
| 2023/0134539 A1* | 5/2023 | Wang | H04L 41/16 709/223 |

OTHER PUBLICATIONS

Nastic et al., "SLOC: Service Level Objectives for Next Generation Cloud Computing", https://dsg.tuwien.ac.at/team/sd/papers/Zeitschriftenartikel_2020_A_Morichetta_SLOC.pdf, May-Jun. 2020, 12 pages.

IBM, "Dynamic Implementation Switching to Support Service Level Agreements on Demand", https://priorart.ip.com/PCOM/000028699, May 27, 2004, 2 pages.

IBM, "SLA Based Autonomic Optimzation of Infrastructure", https://priorart.ip.com/IPCOM/000033318, Dec. 6, 2004, 2 pages.

Araujo, "Has IT become too complex to manage?", https://www.cio.com/article/236610/has-it-become-too-complex-to-manage.html, Nov. 26, 2016, 5 pages.

Anonymous, "Central limit theorem", https://en.wikipedia.org/wiki/Central_limit_theorem, accessed Aug. 16, 2022, 13 pages.

Anonymous, "Rule X: Make way for creativity with data-driven solutions", https://www.rulex.ai/factory/, accessed Aug. 17, 2022, 8 pages.

Anonymous, Dynamic Service-Level-Agreement Aware Automatic Microscaling for Application Servers on Multitenant Systems, https://priorart.ip.com/IPCOM/000254020, May 25, 2018, 2 pages.

* cited by examiner

RISK MITIGATION IN SERVICE LEVEL AGREEMENTS

BACKGROUND

Aspects of the present invention relate generally to service level agreements (SLAs) and, more particularly, to risk mitigation of dynamically evolving infrastructure environment in SLAs.

Bids for large contracts (i.e., the SLAs) are often grounded on a number of assumptions and estimates in order to come up with Service Level Commitments/Objectives (SLOs) of the SLAs for various classes of IT infrastructure and applications. The SLOs are a single objective of the SLA. The SLA defines levels of service (service levels) to expect from a service provider as well as remedies and penalties should the service provider not meet their SLOs, and subsequently the SLA. These SLAs may include agreements for various services, for example, strategic outsourcing contracts for information technology (IT) systems support and maintenance. Assumptions and estimates may include assumptions that no changes to the customer's IT infrastructure will occur, or that labor and resource levels may remain the same. An SLA may include many SLOs to act as a metric (i.e., uptime, response time, etc.) for the progress made on the SLA or for various pieces of the SLA that must be accomplished to meet the SLA.

SUMMARY

In a first aspect of the invention, there is a computer-implemented method including: identifying, by a computing device, relationships between an infrastructure and an application associated with the SLA; identifying, by the computing device, changes to a technological environment of the SLA based on collected data associated with the SLA and the identified relationships, the collected data including infrastructure data associated with the infrastructure and application data associated with the application; establishing, by the computing device, a baseline for a service level objective (SLO) of the SLA by analyzing the collected data of the infrastructure data and the application data; determining, by the computing device, risk impact to the SLA based on an assessment of requirements to the SLO and the changes to the technological environment of the SLA; generating, by the computing device, a solution option for the SLA by applying an explainable artificial intelligence (XAI) model based on processing the risk impact with the baseline in the XAI model; and updating, by the computing device, the SLA based on the solution option.

In another aspect of the invention, there is a computer program product including one or more computer readable storage media having program instructions collectively stored on the one or more computer readable storage media. The program instructions are executable to: identify, by an analysis module, changes to a technological environment of a service level agreement (SLA) based on collected data and relationships among infrastructure and application associated with the SLA, wherein the collected data comprises infrastructure data and application data; analyze, by the analysis module, the infrastructure data and the application data establishing a baseline for a service level objective (SLO) of the SLA; apply, by an assessment module, requirements including change data to the SLO of the SLA to project changes to the SLO; determine, by the assessment module, risk impact to the SLA based on an assessment of the requirements to the SLO and the changes to the technological environment of the SLA; generate, by a solutioning module, a solution option for the SLA based on processing the risk impact with the baseline; and update, by the solutioning module, the SLA based on the solution option.

In another aspect of the invention, there is system including a processor, a computer readable memory, one or more computer readable storage media, and program instructions collectively stored on the one or more computer readable storage media. The program instructions are executable to: collect data associated with a service level agreement (SLA) including an infrastructure data associated with an infrastructure of the SLA and an application data associated with an application of the SLA; identify changes to a technological environment of the SLA based on the collected data and the identified relationships; establish a baseline for a service level objective (SLO) of the SLA by analyzing the infrastructure data and the application data; apply requirements to the SLO of the SLA; identify a deviation between an achieved service level and a contracted SLO and determine a dynamic SLA target (DSLT) based on the deviation; determine risk impact to the SLA based on an assessment of the requirements applied to the SLO including a countermeasure to meet the DSLT and assessment of the changes to the technological environment of the SLA; generate a solution option for the SLA utilizing an explainable artificial intelligence (XAI) model based on processing the risk impact with the baseline; and updated the SLA based on the solution option.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
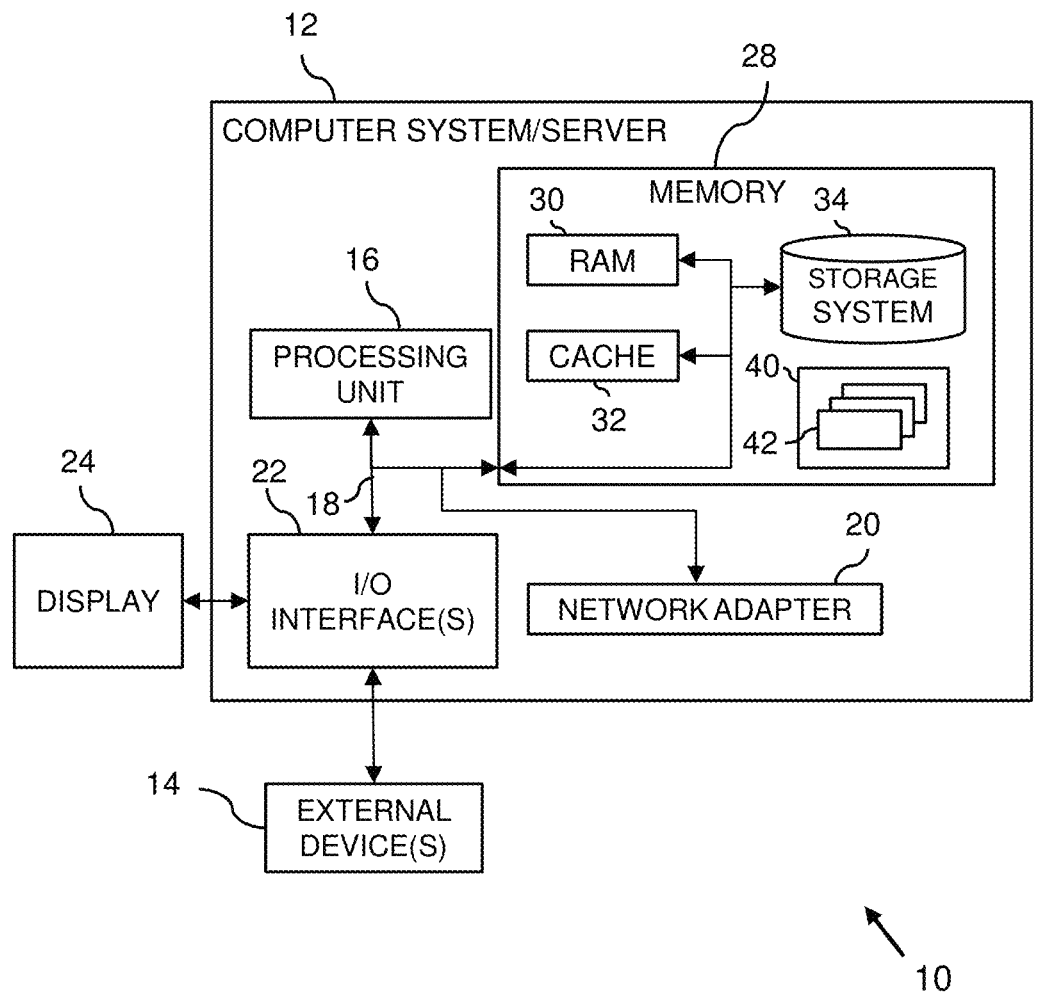
FIG. 1 depicts a cloud computing node according to an embodiment of the present invention.

Aspects of the present invention relate generally to SLAs and, more particularly, to a risk mitigation method for SLAs which account for dynamically evolving infrastructure environments. In embodiments, a computing device uses explainable artificial intelligence (XAI) based deep learning models for risk mitigation in SLAs, thereby accounting for dynamically evolving infrastructure environments. In this manner, implementations of the invention provide a method to mitigate risks in SLAs by meeting stakeholder requirements and making changes to SLAs to adjust for predicted changes using the XAI model. The XAI model provides explanations to outputs in the machine learning modeling. The XAI model is a computer implemented artificial intelligence model meant to provide users with transparency, interpretability, and explainability to the model's decisions so that the results are more trustworthy to the user.

In aspects of the invention, there is a method and system for dynamically measuring achieved service levels for an entire IT environment with multiple layers of technology stacked across traditional data center and cloud-provider environments and developing targeted SLOs. In embodiments, the method includes: gauging the impact of changes in the IT infrastructure on the contracted SLOs (adverse impact or positive impact and to what extent as a percentage or numerical scale); correlating the dynamic (i.e., actual and achieved) service levels (infrastructure uptime/availability/performance) to contracted SLOs and identifying deviations and anomaly patterns; identifying dynamic countermeasures (e.g., up-scale/down-scale the infrastructure capacity or re-engineer/transform the platform) to enable accomplishment of residual SLOs during the measurement windows of a current contract period; and using artificial intelligence (AI) based dynamic and targeted SLO re-computation for generating viable and mutually agreeable changes to SLOs in the ongoing contract with options for conflict resolution for all stakeholders. In embodiments, the recognizing includes using an AI model trained to extract operational requirements from a provided specification (e.g., a secure cloud engineering blueprint, etc.). In embodiments, the AI model is an XAI model trained with data pertaining to all the associated infrastructure, applications, requirements, changes in the IT environment, SLOs, available countermeasures to meet SLOs, and available solutions to SLAs.

The impacts of dynamically evolving infrastructure environment on SLAs may often account for these changes (i.e., changes in resources, regulations, product life cycle, etc.) in the infrastructure environment through estimation using higher costs to the customer and/or greater risk taking by the service provider/vendor(s). The contract preparer has to contend with a number of unknowns such as a) variances in volumes of assets to be covered under the contract, b) state of technology currency of the systems (i.e., there could be systems that have reached the end of useful life), c) the incident and problem history of the infrastructure, and d) the planned technology roadmap for the environment. The process of working up the contract details is therefore dependent on a number of estimations, assumptions, and risk covering clauses in the SLA. Since breaches to contracted SLOs result in penalties to the service provider, SLO commitments for unknown states of IT assets are often fraught with risks. These changes to the IT environment impact the SLOs based on the nature of the change, however, these changes often place large risks on the service provider without consideration by the customer. Approaches to SLA construction are guided by historic experience of supporting similar classes and categories of IT infrastructure assets. Other inputs such as availability of state of art automation tools, technology currency level, staff of skilled technical support resources, and familiarity of the IT environment to be supported also help in determining contractable SLOs at the time of contract bids.

An IT environment (i.e., landscape) may change over time with the introduction of multiple new of technologies from various vendors, cloud service providers and multi-cloud management platforms (e.g., hybrid clouds, internet of things (IOT), blockchain technologies, edge-computing, serverless computing, grid computing, etc.). These changes have a direct impact on the ability of service providers to meet the contracted SLA for the IT environment.

Some examples of these changes include: impact of outage of hardware components that are in short supply for replacement; impact of technology refresh on select IT assets; introduction of new cloud provider platforms into the existing IT environment; introduction of a new tool or technology that offers deep insights on how the contracted assets are performing and predicts failures so pre-emptive actions may be taken; impact of unanticipated shortage of skilled resources to support the IT environment due to attrition or other reasons; migration of select workloads to cloud platforms or transformation to newer technologies; and impact of business events such as divestiture, mergers or adverse external business climate including government and industry regulations that force alteration in the makeup of existing IT infrastructure.

The inability to gauge the impact of changes listed above makes SLO commitments in SLA contracts risky. In existing cloud management platforms or artificial intelligence for information technology operations (AIOps) consoles, the data sources are mostly operational data such as tickets, monitoring, security, health, etc. This data is used to derive operational insights/recommendations, e.g., in instances where disk space on a certain virtual machine is likely to run out in a certain time.

Because of the complexity of these systems and the large number of parameters/factors (i.e., extremely high volumes of factors and thus data) to determine risk impacts to the changes in the IT environment, currently there is no way to gauge/measure or address the impact of these changes on SLAs during the contracting phase of client engagements. No systems and methods exist to correlate how these changes will affect the delivery of SLO commitments, and thus account for changes that may be needed in the SLA to mitigate the contract risks to service providers as well as reduce costs to the customers themselves.

Thus, the risk mitigating SLA device is described below to account for the many additional sources of data including, for example, operational data such as technology roadmaps, application and infrastructure transformation plans, data center and technology consolidation plans, etc., for analyzing the impact of planned and unplanned (event-driven) changes on contracted SLAs.

Accordingly, implementations of the invention provide an improvement in the technical field of risk mitigation in SLAs for the above known problems of changes to an IT environment. For example, in embodiments, the technical solution may include, amongst other features: identifying relationships between an infrastructure and an application associated with the SLA; identifying, by a computing device, changes to a technological environment of the SLA based on collected data associated with the SLA and the identified relationships, the collected data including infrastructure data associated with the infrastructure and application data associated with the application; establishing, by the computing device, a baseline for an SLO of the SLA by analyzing the collected data of the infrastructure data and the application data; determining risk impact to the SLA based on an assessment of various technical and business requirements to the SLO and the changes to the technological environment of the SLA; generating a solution option for the SLA by applying an XAI model based on processing the risk impact with the baseline in the XAI model; and updating the SLA based on the solution option. The technical solution may also utilize knowledge of many parts of a business and IT infrastructure to identify potential risks due to changes in the IT environment. These steps allow a dynamic SLA to provide a risk mitigating solution to changes in an IT environment. Further, these steps allow the risk mitigating SLA computing systems and methods to more efficiently and effectively provide customers with needed reasonably priced services while mitigating risks to a service provider to meet the customer's needs.

It should be understood that, to the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
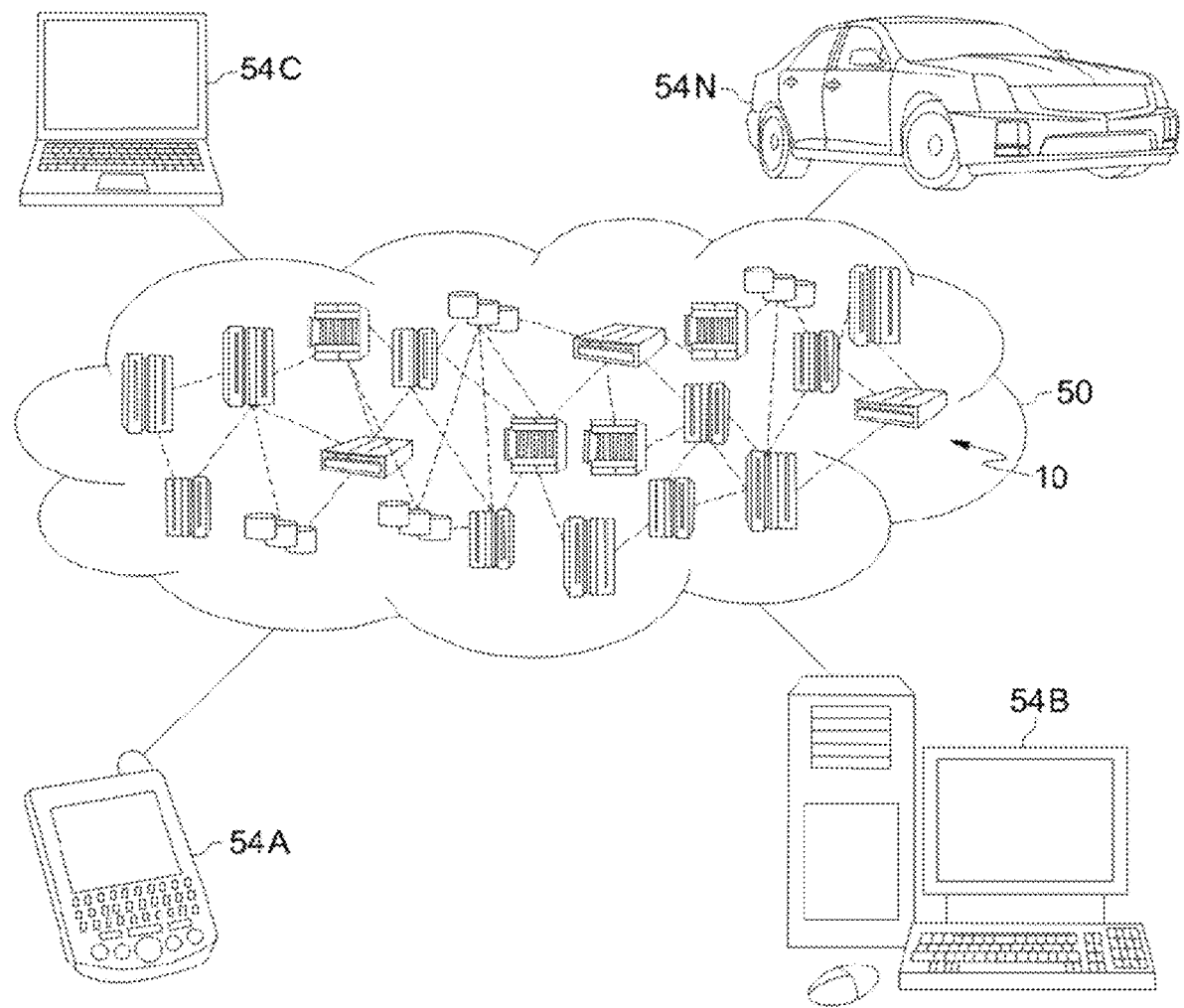
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
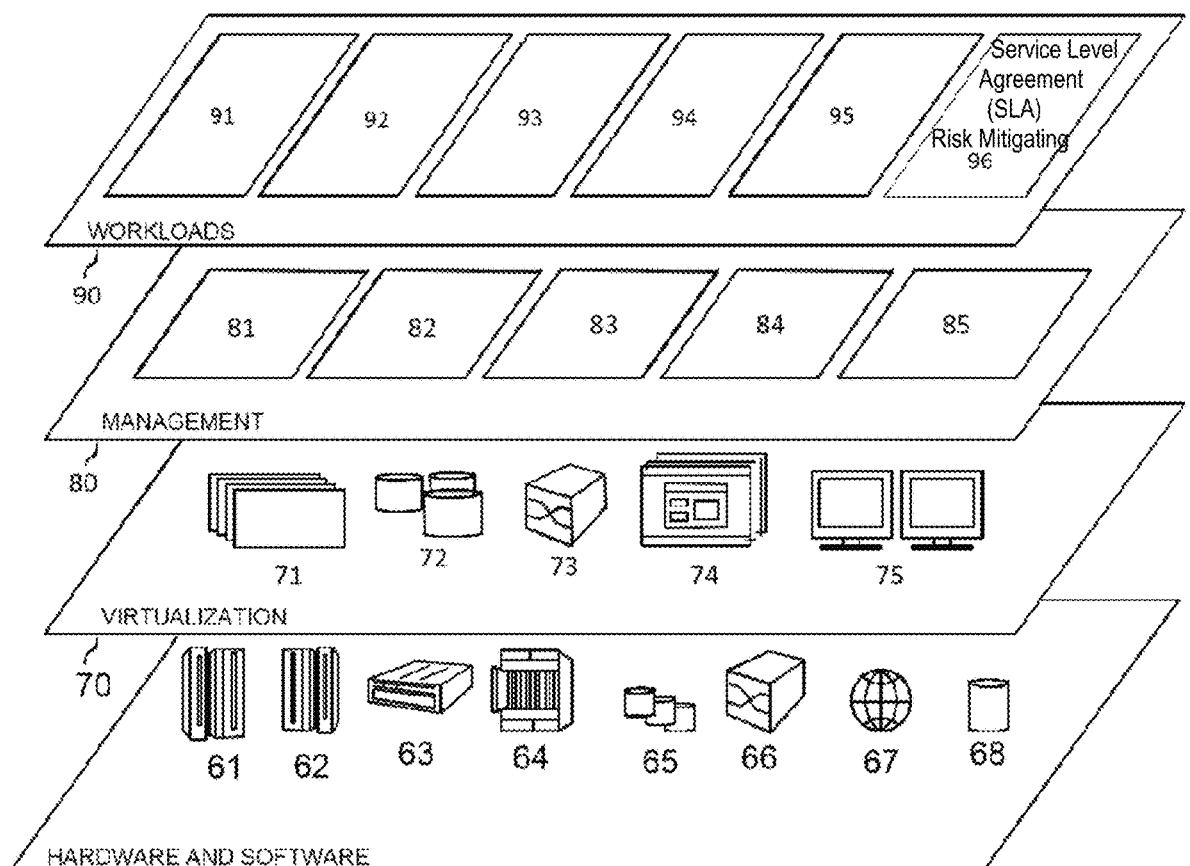
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and SLA risk mitigating 96.

Implementations of the invention may include a computer system/server 12 of FIG. 1 in which one or more of the program modules 42 are configured to perform (or cause the computer system/server 12 to perform) one or more functions of the SLA risk mitigating 96 of FIG. 3. For example, the one or more of the program modules 42 may be configured to: collect data associated with the SLA including an infrastructure and an application; identify relationships between the infrastructure and the application; identify changes to a technological environment of the SLA based on the collected data and the identified relationships; analyze the infrastructure and the application establishing a baseline for an SLO of the SLA; apply requirements to the SLO of the SLA; determine risk impact to the SLA based on an assessment of the requirements to the SLO and the changes to the technological environment of the SLA; generate a solution option for the SLA based on processing the risk impact with the baseline; and update the SLA based on the solution option.

Figure 4:
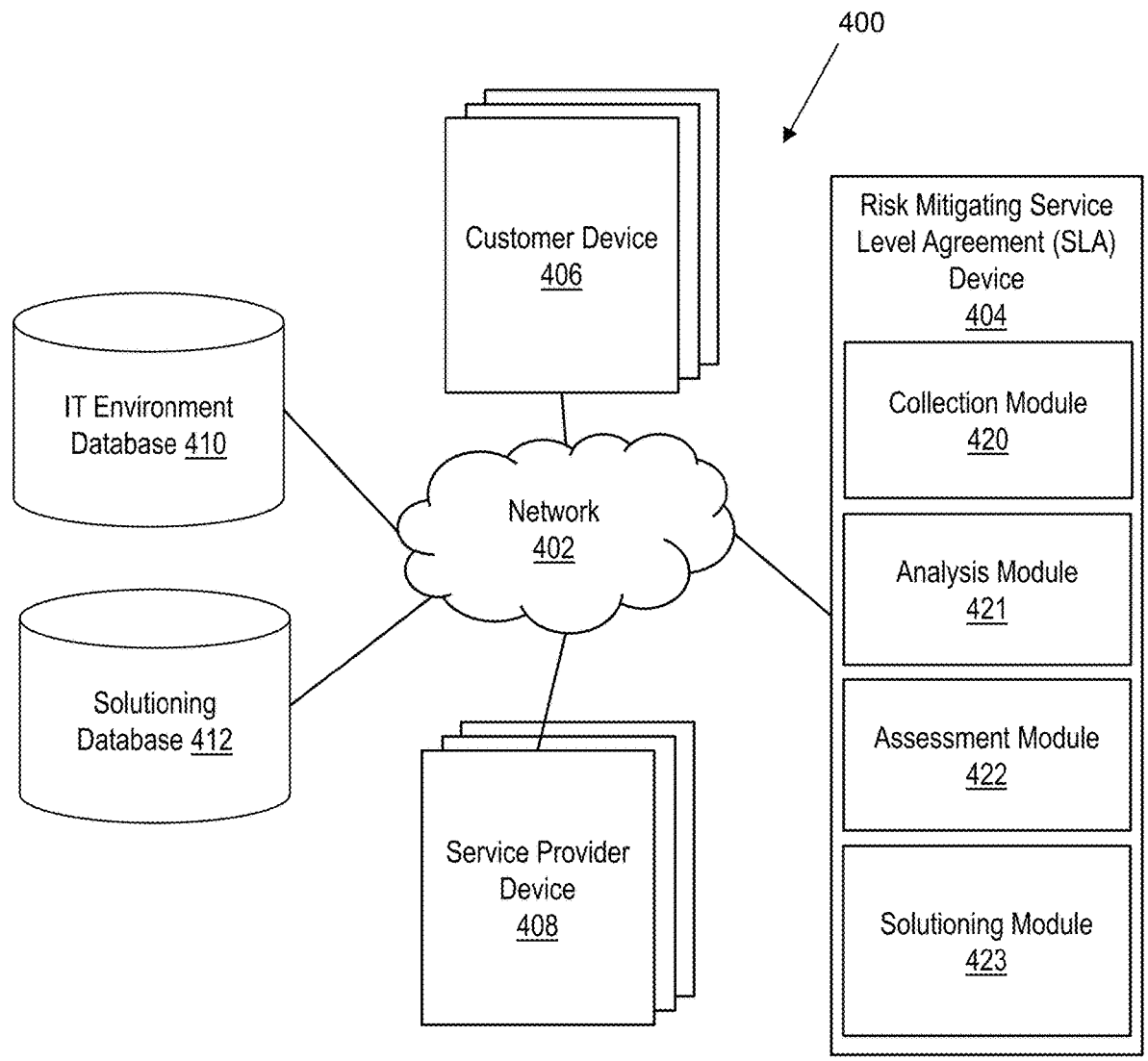
FIG. 4 shows a block diagram of an exemplary environment in accordance with aspects of the invention.

FIG. 4 shows a block diagram of an exemplary environment in accordance with aspects of the invention. In embodiments, the risk mitigating SLA environment 400 includes a network 402 enabling communication between risk mitigating SLA device 404, customer device 406, service provider device 408, IT environment database 410, and solutioning database 412.

In embodiments, the risk mitigating SLA device 404 comprises collection module 420, analysis module 421, assessment module 422, and solutioning module 423, each of which may comprise one or more program modules such as program modules 42 described with respect to FIG. 1. The risk mitigating SLA device 404 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

In embodiments, the collection module 420 is configured to collect data associated with infrastructure and applications that are associated with an SLA. The infrastructure data may include data regarding on-premises, cloud, or hybrid IT infrastructure. In exemplary embodiments, the infrastructure data may be collected from architectural documentation and diagrams; requests for proposal; storage environment and capacity data; site information including cloud deployment; and business investment in hardware, licenses, and development and implementation. In embodiments, the collection module 420 may additionally automatically gather information associated with infrastructure data and application data based on other known information such as the vendors with whom the service provider is working. This information may be gathered from vendor websites using web crawlers or scrapers and API calls. For example, the collection module 420 may collect information from the known vendor working with the service provider as well as any competing vendors and products to determine whether another product may better fit the needs of the project at hand.

In exemplary embodiments, the application data may include data from artificial intelligence for information technology operations (AIOps); event monitoring and ticketing applications; application services; application software components; incidents, problems, and changes (IPC) data; and current project data. For example, the AIOps may include a cloud management platform (CMP) AIOps that may provide performance data for the existing IT environment of the IT infrastructure. Much of this application data may be collected from applications being used by the customer themselves to manage and track performance of IT infrastructure assets such as server hardware, configurations, storage environment, network capacity and links, and application software components and services, as well as the application software quantity, versions, and installation locations. Further insight from applications may include IPC data, event monitoring, and ticketing that may indicate issues with the existing IT infrastructure. The collected data is used to establish a baseline for the existing IT infrastructure and applications that are in place on the customer side and the IT infrastructure and applications that may have effects on other IT infrastructure and applications. The collected data may also establish, as part of the baseline, the IT environment outside of the customer's existing IT infrastructure and applications. This baseline may include vendors and products that may be used in place of existing vendors and products, as well as determining metadata regarding the existing IT infrastructure and applications (e.g., existing infrastructure and applications that may be out of date, run the course of its product lifetime, and/or over/under reliance of a customer on particular products, etc.).

In exemplary embodiments, the collection module 420 normalizes and cleanses the infrastructure data and application data for further analysis in the analysis module 421 and assessment module 422. In exemplary embodiments, the normalization and cleansing include removal of outlier data and normalizing of the data formatting for analysis and assessment. In exemplary embodiments, the collected data is validated with the customer or stakeholders in the SLA. The validation is generated through inquiries regarding collected data. The stakeholders may include internal stakeholders such as business unit and IT group members and external stakeholder such as the service providers and the government. In exemplary embodiments, the stakeholders may also be departments within a customer organization such as production, development, staging, and quality assurance departments. The production department is often the key stakeholder in the customer's revenue generation, and the development, staging, and quality assurance departments have a lower importance. In exemplary embodiments, workloads of the existing IT infrastructure and applications are classified as production, development, and staging environments to indicate the importance of particular applications and infrastructure assets. This importance may provide indications with regard to which IT infrastructure and applications to prioritize in an SLA.

In embodiments, the analysis module 421 is configured to identify dependencies and relationships among the infrastructure assets and applications. In exemplary embodiments, the analysis module 421 performs application to business unit/functional unit mapping. In exemplary embodiments, a dependency map is plotted for the infrastructure assets and applications. For example, operating systems and application software may be mapped to each other and host servers (e.g., hardware systems) and locations of the hardware (e.g., sites such as on-premises, hybrid, or cloud). In exemplary embodiments, a NetFlow analysis is performed to detect dependencies and relationships among various infrastructure assets and application components. These exemplary embodiments indicate the parts of a customer's IT environment that may be affected by SLOs of the SLA.

In embodiments, the analysis module 421 is configured to establish a baseline for analytics. The baseline establishes the existing IT infrastructure and applications from which contracted changes of the SLA and SLOs will be based. In exemplary embodiments, the analysis module 421 uses the collected data associated with infrastructure assets to extract metadata regarding the installed hardware and software platforms (e.g., host servers, operating systems, application software components, etc.) to analyze diversity, sprawl, and volumes of current platforms in the IT environment. In exemplary embodiments, the analysis module 421 also lists product families and vendors. For example, the analysis module 421 may determine supported hardware and software platforms including third party vendors (i.e., non-stakeholders in the SLA) that may be supported by the existing IT infrastructure and applications. In exemplary embodiments, the analysis module 421 performs NLP on the extracted metadata from the information associated with the existing IT infrastructure and applications, the information regarding the product family lists of the existing IT environment, etc., to identify platforms that have reached end-of-life and those heading toward end-of-life in the near future (i.e., within the next 6 to 18 months). The NLP may also be used to identify platforms with a long useful life left. The baseline may include the IT environment as a whole along with the existing infrastructure and applications. The existing infrastructure and applications may include placement within the IT environment as a whole (e.g., a server with a previous generation's hardware that could be upgraded/updated).

Further, the stakeholders may provide the analysis module 421 with requirements for application to the baseline. This applying of the requirements imposed by the stakeholders may provide additional drivers of change from the IT environment. This application of the requirements to the infrastructure data and application data may show what aspects of the IT environment may change over time and/or emphasize or de-emphasize particular areas of the infrastructure and applications that may have pressures/forces affecting further change. The analysis module 421 may use the collection module 420 to gather some of the information required in this analysis. For example, the collection module may collect additional information regarding the IT environment (e.g., known business drivers, labor and resource constraints, regulations, etc.).

In embodiments, the analysis module 421 also identifies changes in the IT environment that may occur. In exemplary embodiments, the changes are based on requirements or collected data on the IT infrastructure and applications. For example, if some part of the IT infrastructure is coming to the end of its life cycle, a change to upgrade, update, or replace that part of the IT infrastructure may be identified. Further, the timeline for such a change may be identified.

The requirements may include requirements based on business drivers and constraints; functional and non-functional requirements for technology modernization; assessing business trends; and regulatory compliance issues. For example, business drivers and constraints may include anticipated business growth in the near to medium term; anticipated corresponding growth in IT infrastructure to support the growth of the business; business and technology roadmaps of the customer organization; list of high criticality applications from the standpoint of business stakeholders; and selection of new applications that are likely to be implemented to support the business etc. In exemplary embodiments, the business trends, drivers, and constraints may be collected through emails, other correspondence, or directly from the stakeholders.

Examples of functional and non-functional requirements for technology modernization may include resource and skill constraints; performance, availability, security and regulatory requirements; placement rules for physical and logical components during proposed upgrade approaches; and technology currency requirements (e.g., updated or past versions of software and hardware). Examples of assessing business trends include assessing how mergers and acquisitions may result in increased data processing and integration of heterogeneous environments impacting the performance and availability; and assessing how divestiture or de-merger may throw up similarly new requirements to separate the infrastructure and applications impacting the performance and availability. Examples of regulatory compliance issues include recent examples of such regulatory or compliance requirements that are associated with local or company regulations requesting particular privacy levels be met, security levels for data be met, etc., and considering impacts on the performance and availability dimensions of the existing IT environment which will translate into SLO breach risks. Conversely, modernization of legacy workloads to a hybrid cloud and transformation of monolithic applications to micro services and serverless architecture will improve the performance and availability and therefore entails corresponding upward revision to SLOs.

In embodiments, the collection module 420 and analysis module 421 may store and manage collected information in the IT environment database 410. This IT environment database 410 may include any information associated with the existing IT infrastructure and applications, the existing IT environment offerings (e.g., vendors, products, resources, etc.) that may be used, and other known effectors in the IT environment that may affect changes to the existing IT infrastructure such as regulations, life cycle of existing products, business drivers/changes, etc.

In embodiments, the assessment module 422 is configured to assess changes and requirements for risk impact to the SLOs of the SLA. In exemplary embodiments, the assessing includes one more of the following: assessments of current projects; identification of optional changes to the IT infrastructure and application based on changes to the IT environment; determining current and historical service levels for various categories of infrastructure; assess deviations between actual progress (i.e., achieved service level) in meeting an SLO and the contracted SLO for a measurement period; assign risk levels to the IT infrastructure; and determine countermeasures to meet an SLO.

In exemplary embodiments, the assessing performed by the assessment module 422 includes assessment of in-flight (i.e., current) projects by assessing a desired target state characteristics and/or the current state of the project. The desired target state characteristics may include processing throughput, business continuity, technical resiliency, connectivity, and supportability. These desired target state characteristics are characteristics that will affect the SLOs of the SLA.

In exemplary embodiments, the assessing performed by the assessment module 422 includes identification of optional changes to the IT infrastructure and application based on changes to the IT environment. These optional changes may be from the collected data regarding products of the infrastructure assets and applications from vendors that could be used. These optional changes may include new OS platforms and versions, application software and versions, cloud and non-cloud hosting options, hardware platforms, etc. that may be added to or replace the existing infrastructure and applications.

In exemplary embodiments, the assessing performed by the assessment module 422 includes determining current and historical service levels for various categories of infrastructure. These service levels may include the types of work that may be needed for the infrastructure, sources of data, tooling used, mechanisms for review, etc. These service levels should be for categories of infrastructure that are similar to the infrastructure and applications associated with the SLA. For example, from the collected IPC data, the assessment module 422 may identify systems and subsystems including applications that are consistently experiencing performance or latency issues thereby affecting end-users. In one example, this includes comparing the achieved service levels to contracted SLOs. In another example, this includes correlating the availability and performance levels to contracted service levels. In another example, this includes correlating other known risks (e.g., age of the hardware, technology currency of hardware or software, computing load on components, mean time between failure (MTBF) data of various infrastructure and application components, etc.) to actual availability and performance levels of the existing IT infrastructure and applications.

In exemplary embodiments, where there are deviations between achieved service levels and contracted SLOs, the assessing performed by the assessment module 422 includes computing the residual SLO to be accomplished for the measurement period (i.e., the Dynamic SLA Target (DSLT)). The assessment for the deviation assumes there are no other infrastructure changes during the said period. For example, in instances where there are additional IT infrastructure and application changes to the existing IT infrastructure and applications, the DSLT will need to be re-computed again (i.e., dynamic computation of the DSLT). In embodiments, the measurement period includes a measurement time that is during the current contract period. These changes in existing IT infrastructure and applications may include: migration of workloads across cloud vendors; replacement of major components as part of maintenance and service cycle; virtualization of existing servers, new virtual machines and containers; new technology inducted into the environment; firmware/device currency of critical components especially in mainframe systems and storage systems; changes to redundancy configurations; replacement of applications software reaching end of life; modernizing apps which will have impact on SLA; instantiation of new cloud services; and deployment of better monitoring or management tools.

In exemplary embodiments, the assessing performed by the assessment module 422 includes assigning risk levels to hardware platforms, OS platforms, and application software based on the analysis of collected data including data that relates to the performance, availability, technology currency, and supportability of the hardware platforms, OS platforms, and application software. The risk levels may provide a way to prioritize existing IT infrastructure and applications that have a higher likelihood to fail (as well as the risk type) and result in issues with the SLA and/or prioritize parts of the SLOs of the SLA that are associated with those existing IT infrastructure and applications to circumvent any potential issues.

In exemplary embodiments, the assessing performed by the assessment module 422 includes determining countermeasures to meet an SLO based on the above determined DSLT. The assessment module 422 may be configured to work with the solutioning module 423 and collection module 420 to determine countermeasures that will help meet the SLO. These countermeasures may add to or change the IT infrastructure or speed up progress for the service provider to meet the SLO. The investments required for the countermeasures may be considered in comparison to estimated penalty pay-outs on estimated SLO breaches on account of any changes to the existing IT infrastructure and applications. In other examples, AI models may project performance and availability specifications with estimated investment to determine ideal options for countermeasures that will accomplish the DSLT.

In embodiments, the solutioning module 423 is configured to work with the collection module 420 and assessment module 422 to generate solution options. In exemplary embodiments, the solutioning module 423 may work with the collection module 420 and assessment module 422 to eliminate outliers in the IT infrastructure asset and application data with a multivariate analysis; use multilinear regression analysis to gauge the relative impact of key variables on the risk levels; use directional acyclic graphs to perform what-if analysis for various options; and create a mathematical model using key variable to project an updated SLO structure.

In exemplary embodiments, the solutioning module 423 detects and eliminates outliers in IT infrastructure asset and application data with multivariate analysis. For example, multivariate analysis may include a clustering analysis to detect outliers in the data and determine key parameters that are associated with clusters. In some examples, this clustering analysis is done by a machine learning model that is part of the XAI model. In other examples, the multivariate analysis may utilize a machine learning modeling that may include a multilinear regression analysis. The multilinear regression analysis may use boxplots to remove outliers in the data. The machine learning may include applying the XAI model to provide explanations for the outliers. The XAI model being trained with collected historical data and variables.

In exemplary embodiments, the solutioning module 423 utilizes a multilinear regression analysis to gauge the relative impact of key variables (various changes and requirements) on the risk levels. For example, the multilinear regression analysis may use the machine learning modeling above to apply multilinear regression analysis on the collected data that has removed the outliers to determine the importance of key variables on risk. In some examples, this multilinear regression analysis is done by the machine learning model that is part of the XAI model.

In exemplary embodiments, the solutioning module 423 utilizes directional acyclic graphs to perform what-if analyses for various options showing outcomes of each option so the stakeholders can make informed decisions. The directional acyclic graphs apply the XAI model to generate relationships between the variables and describe effects of different solution options to stakeholders. These what-if analysis descriptions may provide stakeholders with the possible explanations for identifying assumptions that different solutions options may provide, along with the results of applying these solution options.

In exemplary embodiments, the solutioning module 423 creates a mathematical model using key variables (various changes to the IT environment and requirements to the SLO) to project changes to the SLO resulting in an updated SLO structure. The solutioning module 423 may apply the mathematical model to gauge the impact of changes. The mathematical model may include a probabilistic model or deterministic model. The mathematical model (probabilistic or deterministic) is selected based on the contemplated variables for the solution option. In instances where most variables are unknown, the probabilistic model is used and in instances where most of the variables are known, the deterministic model is used. In exemplary embodiments, the solutioning module 423 applies a central limit theorem to the variables to determine a normalized distribution for the sum of the variables in order to generalize and identify effects of changes and/or solution options.

In exemplary embodiments, the XAI model is also applied to generate solution options with a confidence scoring for each option. The confidence scoring is based on the solution options that will result in meeting the SLO based on the requirements and changes to the IT environment. For example, the requirements may include prioritization of timeliness over additional costs and/or determination that implementation costs of the solution option may be less than the costs of breach of contract. Thus, solution options that meet the timeline at a lower implementation cost may be prioritized over even lower implementation costs that do not meet the timeline. The confidence score for the solution option meeting the timeline will be higher than the solution option that does not meet the timeline in the SLA.

In exemplary embodiments, the XAI model is trained using training data including one or more of historical decisions based on variables including the stakeholders, affected IT infrastructure assets and applications, requirements, changes, countermeasures addressing DSLTs, and solution options. Additionally, the recommended (i.e., based on confidence level) solution options and countermeasures may be presented to stakeholders for verification of their value to the stakeholder. For example, the stakeholders may re-prioritize solution options and countermeasures to provide the XAI model with better training data. The stakeholders may also present the XAI model with reasons for why they have selected a solution option or countermeasure. In embodiments, this reasoning may be analyzed using NLP to identify key factors and elements that are important to the user. This reasoning may then be fed back into the XAI model to present better solution options in future uses.

In embodiments, the solutioning module 423 updates the SLA and determines analytical results of solution options that address the risk impacts to the existing IT infrastructure associated with the SLA. In exemplary embodiments, the solution options are presented to stakeholders for selection. Selections advantageously are mutually agreeable by both parties in the SLA. The solutioning module 423 presents stakeholders in the SLA with explanations for the solution option. However, in embodiments, the stakeholders may also be provided with options for conflict resolution to make mutually agreeable decisions. For example, the solutioning module 423 may present stakeholders with a prioritization of requirements.

In exemplary embodiments, the solutioning module 423 identifies all the existing IT infrastructure and applications that will be impacted by changes in the IT environment. This IT infrastructure and applications affected by the changes in the IT environment will require newly computed DSLTs to be applied. In exemplary embodiments, the solutioning module 423 identifies all the new IT infrastructure systems or sub-environments that should be brought into the SLA from updated inventories of discovered IT infrastructure and applications that may be used. In exemplary embodiments, the solutioning module 423 identifies all the new IT infrastructure systems or sub-environments that should be brought into the SLA from changes occurring in the IT environment. In exemplary embodiments, the solutioning module 423 places countermeasures of the SLO in the construct of the overall IT environment taking into consideration all the above. In exemplary embodiments, the solutioning module 423 presents proposals for the countermeasures to address DSLT deviations and other solution options used in updating the SLA for the IT environment.

In embodiments, the assessment module 422 and solutioning module 423 may store and manage identified countermeasures and solution options in a solutioning database 412. This information about the countermeasures and solution options may also include the selected countermeasures and solutions, reasoning for selection, as well as the results of their selection/use.

Figure 5:
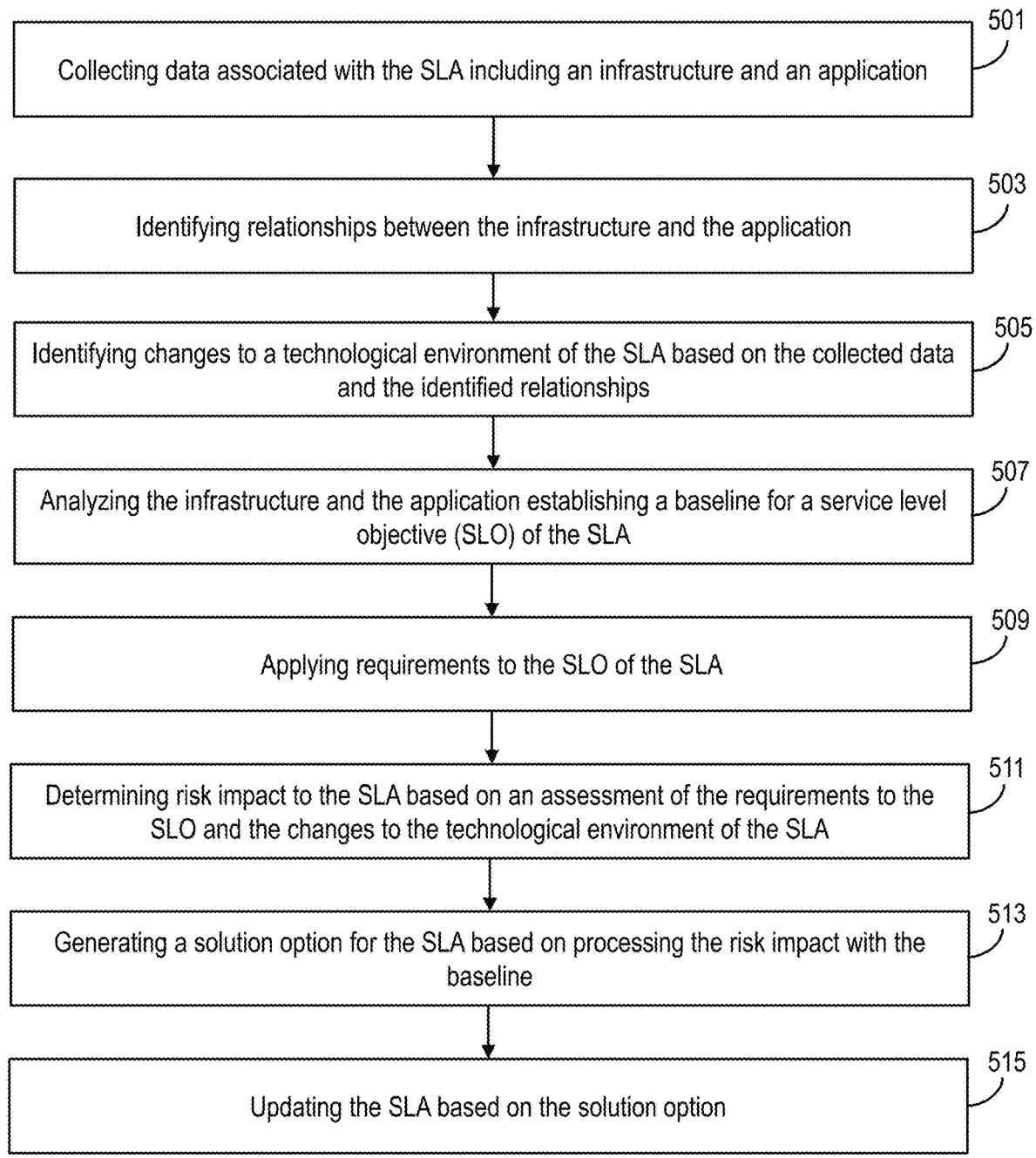
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 501, the risk mitigating SLA device 404 of FIG. 4 collects data associated with the SLA including an infrastructure and an application. In embodiments, the collected data is associated with the IT infrastructure and applications of a customer. In embodiments, the collection module 420 of the risk mitigating SLA device 404 collects information about the IT environment of the SLA. The collected information will include at least information about the IT infrastructure and applications of the customer.

At step 503, the risk mitigating SLA device 404 of FIG. 4 identifies relationships between the infrastructure and the application. In embodiments, the analysis module 421 of the risk mitigating SLA device 404 is used to identify the relationships and dependencies among the IT infrastructure and application.

At step 505, the risk mitigating SLA device 404 of FIG. 4 identifies changes to a technological environment of the SLA based on the collected data and the identified relationships. In embodiments, the assessment module 422 of the risk mitigating SLA device 404 is used to identify changes in the IT environment based on the collected data from the collection module 420 and identified relationships from the analysis module 421. Such changes may include, for example, regulation changes resulting in the need to increase data security of the existing IT infrastructure and applications.

At step 507, the risk mitigating SLA device 404 of FIG. 4 analyzes the infrastructure and the application establishing a baseline for an SLO of the SLA. In embodiments, the assessment module 422 of the risk mitigating SLA device 404 is used to identify changes in the IT environment based on the collected data from the collection module 420 and identified relationships from the analysis module 421.

At step 509, the risk mitigating SLA device 404 of FIG. 4 applies requirements to the SLO of the SLA to project changes to the SLO. Requirements may be collected for regulations, from stakeholders, or based on determined machine learning modeling predicting the needs of stakeholders in the SLA, etc. In embodiments, the analysis module 421 of the risk mitigating SLA device 404 may provide these requirements to the assessment module 422 of the risk mitigating SLA device 404 to determine potential changes and/or issues resulting from the requirements and thereby project changes to the SLO.

In exemplary embodiments, applying the requirements includes changes to the SLO of the SLA where the requirements include business drivers, technological drivers, and regulatory compliance issues that affect the IT environment of the SLA and subsequently the SLOs. These requirements may be provided by the stakeholders or determined by machine learning modelling, or determined from regulations. These requirements may be applied to an SLO by determining effects of the requirements on the IT environment and subsequently to the SLO. In one exemplary embodiment, the requirement may include regulations that may require changes to the IT environment. Once applied to the IT environment, effects of those requirements on the SLO may be assessed. For example, a regulation may require updated customer on-site storage of sensitive customer information. As applied to the IT environment, the regulation will require changes to the customer on-site storage. In this manner implementations provide for projecting changes to the SLO by applying the requirements to the SLO.

At step 511, the risk mitigating SLA device 404 of FIG. 4 determines risk impact to the SLA based on an assessment of the requirements to the SLO and the changes to the technological environment of the SLA. In embodiments, the assessment module 422 of the risk mitigating SLA device 404 assesses risk impact of requirements and changes to the IT environment by assigning risks levels to changes in the IT environment, identifying options to address such changes, service levels of the existing IT infrastructure, and assess current projects that may be affected by the changes and requirements.

In exemplary embodiments, the assessment of the applied requirements to the SLO includes assessing how the changes to the IT environment (from the requirements) will affect the SLO of the SLA. In the above example of the regulation requiring updated customer on-site storage, the risk impact to the SLA includes a net positive assessment of the changes to the IT environment since the updates to the customer on-site storage may coincide with objectives (SLO) of the SLA and reduce the time or retain the timeline of the SLO of the SLA.

At step 513, the risk mitigating SLA device 404 of FIG. 4 generates a solution option for the SLA based on processing the risk impact with the baseline. In embodiments, the solutioning module 423 of the risk mitigating SLA device 404 generates the solutions options based on the risk impacts. The riskier and more a change or regulation affects the IT environment and subsequently the SLA, the more a solution option is prioritized. The solution option is generated based on changes to the technological environment of the SLA and impact of those changes based on the established existing IT infrastructure and application baseline. For example, in the instance of the regulation changes, the risk impact may be on any hardware such as servers, routers, switches, and applications that are accessible to external users that are out of date. The risk being their need to meet the new regulations, and fines that could result if this existing IT infrastructure and applications remains un-updated.

In exemplary embodiments, the processing of the risk impact to the SLA is based on the assessment of the requirements applied to the SLO including a countermeasure to meet the DSLT and assessment of the changes to the technological environment (i.e., IT environment) of the SLA. In the above example of the regulation requiring updated customer on-site storage, no countermeasure will be required. In another example, the regulation may require the customer on-site storage to retain an outdated version of an operating system (since the regulation may require the use of an application that can only be executed on outdated versions of the operating system). The assessment may include a determination of a countermeasure that requires a lot of time and resources to overcome operating system issues, thus the risk impact to the SLA will include a net negative and increase the costs (time and resources) of the effected SLOs of the SLA.

At step 515, the risk mitigating SLA device 404 of FIG. 4 updates the SLA based on the solution option. In embodiments, the solutioning module 423 of the risk mitigating SLA device 404 updates the SLA based on the solution option that is selected. For example, a solution option to meeting the requirements of the new regulations requiring changes is to update the affected IT infrastructure and applications to meet the data security requirements of the regulations. Although this may not have been an anticipated regulation change, a change the SLA to address the issue, as long as the change does not place an unreasonable burden on the service provider, may further account for additional payments to cover such a solution option.

Figure 6:
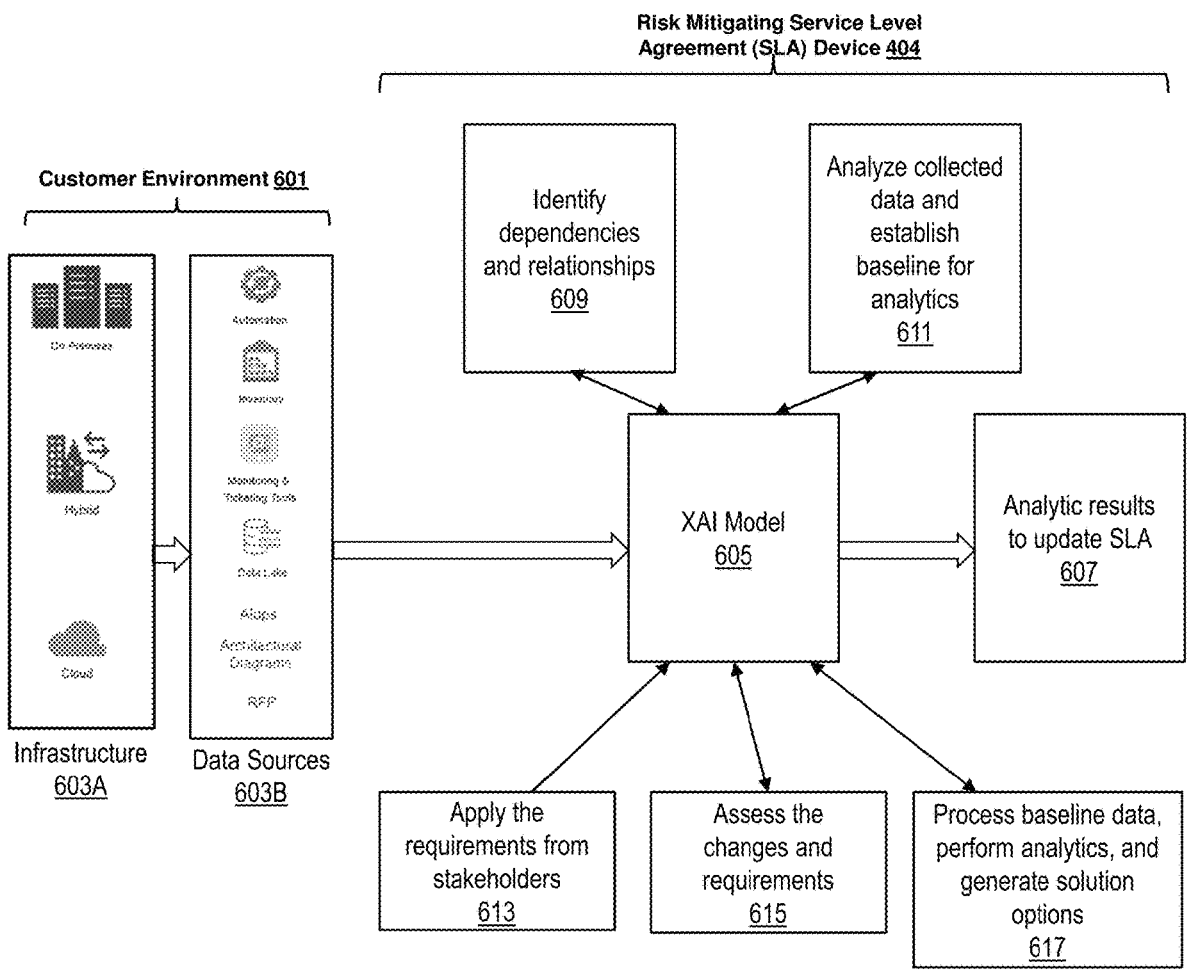
FIG. 6 shows a diagram of a risk mitigating SLA device utilizing an XAI model in accordance with aspects of the present invention.

FIG. 6 shows a diagram of a risk mitigating SLA device utilizing an XAI model in accordance with aspects of the present invention. In embodiments, the risk mitigating SLA device 404 includes an XAI model 605 that collects information from customer environment 601. The customer environment 601 includes infrastructure data 603A and application data sources 603B. In embodiments, the XAI model 605 further collects and applies requirements from stakeholders 613 in the SLA for use in the AI model. In embodiments, the XAI model 605 further collects and sends data to identify dependencies and relationships 609 among the infrastructure and applications. In embodiments, the XAI model 605 analyzes collected data and establishes a baseline for analytics 611 of the SLO in the SLA. In embodiments, the XAI model 605 assesses the changes and requirements 615. In embodiments, the XAI model 605 processes the baseline data, performs analytics, and generates solutions options 617 to the SLA for use in the XAI model. In embodiments, the XAI model 605 is used throughout this process, including the XAI model 605 in every step: 609-617. In embodiments, the XAI model 605 is used at discrete points of the process (i.e., included with one or more of the steps 609-617). The XAI model then generates a solution option that is used to update the SLA 607.

In this example, the infrastructure data 603A includes data regarding existing on-premises, hybrid, and cloud IT infrastructure. In this example, the application data sources 603B include data collected from automated IT management applications, inventory management applications, monitoring and ticketing tools like NetFlow analysis, data from a centralized repository management such as a data lake, data from AIOps, data from architectural diagrams of the IT infrastructure, and directly from information in requests for proposal (RFP). This collected data from the customer IT environment is passed to the XAI based model 605 to be utilized in many different types of analysis.

In embodiments, the XAI model 605 also applies requirements from stakeholders 613. These requirements are applied to SLO of the SLA to assess risk impacts to the SLA (i.e., through assessment module 422) to identify solutions options or countermeasures (i.e., through solutioning module 423) that may be used to mitigate those risks to the stakeholders in the SLA. In embodiments, the XAI model 605 may track and collect data regarding results of those countermeasures and solutions options to provide these results to the assessment module 422 and solutioning module 423 to provide solutions and countermeasures that are curated to the stakeholders. The requirements may include business or IT needs that may affect the SLOs of the SLA. For example, during a pandemic, many employees began working remotely, this resulted in the need to expand access to work data by increasing accessibility resources. Thus, more network resources may be needed, or cloud implementation of on-premises infrastructure assets may be needed to address increased remote connections to the IT infrastructure.

In embodiments, the XAI model 605 identifies dependencies and relationships 609 among the IT infrastructure and applications in the customer IT environment 601 to determine what applications and infrastructure assets may be affected by changes to parts of the IT environment 601. The dependencies and relationships are determined (i.e., through the analysis module 421) and used by the XAI model 605. The XAI model 605 may also pass newly determined dependencies/relationships back to the analysis module 421 for more accurate analysis of the IT environment. For example, OS platforms of all the infrastructure assets in the IT environment 601 may be out of data and need updating to address potential security risks and/or incompatibility with needed applications.

In another example, one workflow or project may affect another piece of the IT infrastructure and applications without having a direct effect. For example, revenue generated from one sale/project may be used to upgrade other parts of the business. This investment may not place a direct dependence/relationship between the sale/project to the other parts of the business but may have effects when the project ends.

In embodiments, the XAI model 605 analyzes the collected data on the IT infrastructure and applications to establish the existing IT environment baseline for analytics 611 to set a baseline from which a determination of whether an SLO is being met. The collected data may be passed between the XAI model 605 to the analysis module 421 to better establish a baseline. For example, the XAI model 605 may determine a factor, such as labor resources in the IT environment will not likely change during the lifetime of the SLA. The XAI model 605 may then notify the analysis module 421 to place less emphasis on a potential change to labor resources.

In embodiments, the XAI model 605 assesses changes to the IT environment and requirements to determine how the changes and requirements will affect the SLOs of the SLA. The risk impacts from these changes and requirements may be passed between the XAI model 605 and the assessment module 422 to better determine risk impacts of the changes in the IT environment and requirements. For example, the XAI may determine a more innocuous change, such as an OS version becoming outdated, has widespread and lasting effects by opening up the customer IT infrastructure to malicious parties (i.e., hackers).

In embodiments, the XAI model 605 processes the baseline data of the existing IT infrastructure and applications to generate solution options that may resolve the effects of the changes and requirements on the SLOs of the SLA. The solution options may be passed between the XAI model 605 and the solutioning module 423 and assessment module 422 to present stakeholders with more curated solutions. These solution options may be curated to the stakeholders and based on their historical effectiveness. These generated solution options may be passed from XAI model 605 to stakeholders for selection and the selected solution options will provide analytic results for use to update the SLA 607.

Figure 7:
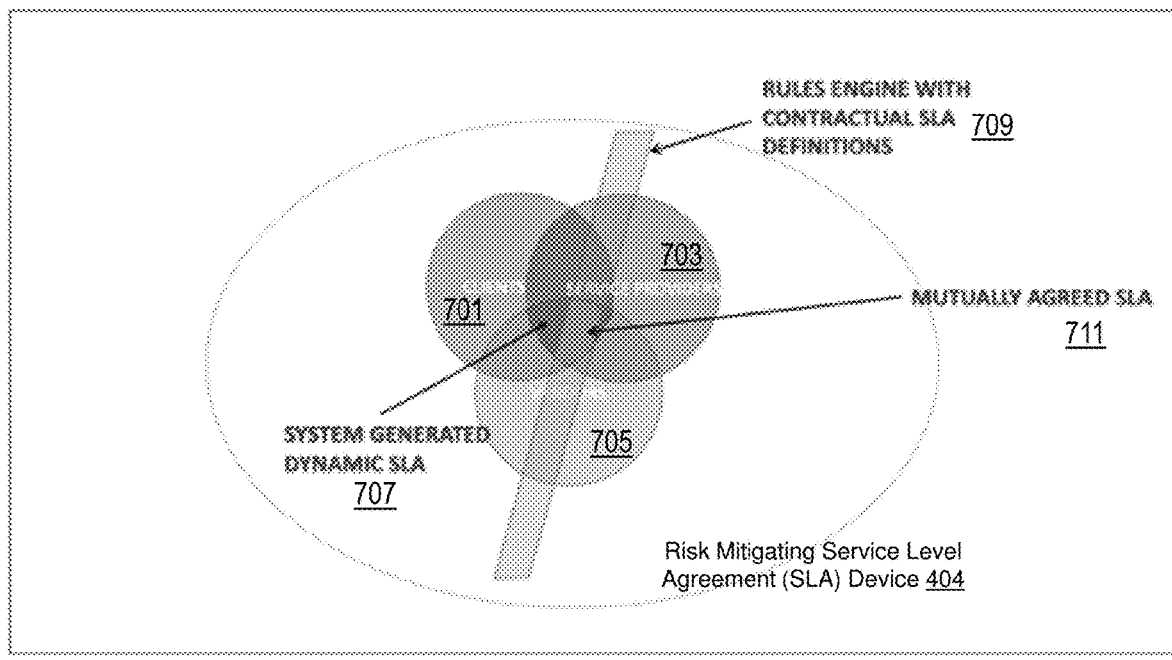
FIG. 7 shows a Venn diagram of interests of potential stakeholders in an SLA in accordance with aspects of the present invention.

FIG. 7 shows a Venn diagram of interests of potential stakeholders in an SLA in accordance with aspects of the present invention. As shown, the interests of clients 701, service providers 703, and vendors 705 may only coincide with one another in a small space including both the system generated dynamic SLA 707 (i.e., an SLA with terms generated using the risk mitigating SLA device 404). The generated dynamic SLA 707 will account for the interests of the clients 701, service providers 703, and vendors 705 (less important since vendors 705 are not generally parties to the SLA). Additionally, a rules engine 709 including contractual SLA definitions may narrow the terms of the generated dynamic SLA 707, since some contractual terms cannot be accounted for and therefore may not be possible. However, a mutually agreed SLA 711 will still exist in the space of potential generated dynamic SLAs 707 but may account for priorities of the clients 701, service providers 703, and vendors 705 that may not be as clear when generating the dynamic SLA 707, and should account for the contractual SLA definitions from the rules engine 709 (i.e., solutioning module 423 of the risk mitigating SLA device 404). The rules engine 709 may include different terms used in agreements to define SLO and subsequently SLA requirements. These terms may be combined together to generate an SLO for the SLA that addresses the changes in the IT environment. Thus, this Venn diagram shows areas of interest and where a mutually agreed SLA may lie.

In embodiments, a service provider could offer to perform the processes described herein. In this case, the service provider can create, maintain, deploy, support, etc., the computer infrastructure that performs the process steps of the invention for one or more customers. These customers may be, for example, any business that will be a party to an SLA. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of mitigating risks in a service level agreement (SLA), comprising:
   identifying, by a computing device, relationships between an infrastructure and an application associated with the SLA;
   identifying, by the computing device, changes to a technological environment of the SLA based on collected data associated with the SLA and the identified relationships, the collected data including infrastructure data associated with the infrastructure and application data associated with the application;
   establishing, by the computing device, a baseline for a service level objective (SLO) of the SLA by analyzing the collected data of the infrastructure data and the application data;
   determining, by the computing device, risk impact to meeting the SLA based on an assessment of requirements to the SLO and the changes to the technological environment of the SLA, wherein the requirements include business drivers, technological drivers, and regulatory compliance issues associated with the SLA;
   generating, by the computing device, a solution option for the SLA by applying an explainable artificial intelligence (XAI) model based on processing the risk impact with the baseline in the XAI model; and
   updating, by the computing device, the SLA based on the solution option.

2. The method of claim 1, further comprising:
   collecting the requirements to the SLO from stakeholders in the SLA to assess in the determining of the risk impact.

3. The method of claim 1, further comprising:
   projecting changes by applying the requirements to the SLO.

4. The method of claim 1, further comprising:
   categorizing the changes to the technological environment of the SLA based on impact to the SLO.

5. The method of claim 1, wherein the application data includes data associated with one or more selected from a group consisting of:
   artificial intelligence for information technology operations (AIOps);
   event monitoring and ticketing;
   application services;
   application software components;
   incidents, problems and changes (IPC) data; and
   current project data; and
   the infrastructure data includes data associated with one or more selected from a group consisting of:
   architectural documentation and diagrams;
   requests for proposal;
   storage environment and capacity data;
   site information including cloud deployment; and
   investment in hardware, licenses, and development and implementation.

6. The method of claim 1, further comprising:
   normalizing the collected data; and
   validating the collected data with stakeholders.

7. The method of claim 1, wherein the identifying relationships is performed using a NetFlow analysis or a dependency mapping.

8. The method of claim 1, wherein the requirements to the SLO include change data, the method further comprising:
   collecting the change data including one or more selected from a group consisting of:
   changes to business organization, the infrastructure, or an application environment;
   technological modernization;
   business trends; and
   regulation and compliance.

9. The method of claim 1, further comprising:
   generating the assessment of the requirements to the SLO by:
   determining target states of current projects;
   identifying replacement options for the infrastructure;
   comparing service levels for similar categories of infrastructure;
   identifying a deviation between an achieved service level and contracted SLO and determine a dynamic SLA target (DSLT) based on the deviation;
   assigning risk levels to the infrastructure based on a performance analysis, availability, and support; and/or
   determining a countermeasure to meet the DSLT.

10. The method of claim 1, wherein the generating the solution option for the SLA is performed using a multilinear regression analysis.

11. The method of claim 1, wherein the generating the solution option for the SLA is performed using a mathematic model to gauge impact of the changes.

12. The method of claim 1, wherein the computing device includes software provided as a service in a cloud environment.

13. A computer program product comprising one or more computer readable storage media having program instructions collectively stored on the one or more computer readable storage media, the program instructions executable to:
   identify, by an analysis module, changes to a technological environment of a service level agreement (SLA), based on collected data and relationships among infrastructure and application associated with the SLA, wherein the collected data comprises infrastructure data and application data;
   analyze, by the analysis module, the infrastructure data and the application data establishing a baseline existing IT environment for a service level objective (SLO) of the SLA;
   apply, by an assessment module, requirements including change data to the SLO of the SLA to project changes to the SLO, wherein the requirements include business drivers, technological drivers, and regulatory compliance issues associated with the SLA;

determine, by the assessment module, risk impact to meeting the SLA based on an assessment of the requirements to the SLO and the changes to the technological environment of the SLA;

generate, by a solutioning module, a solution option for the SLA based on processing the risk impact with the baseline; and update, by the solutioning module, the SLA based on the solution option.

14. The computer program product of claim 13, wherein the generating the solution option for the SLA is performed using an explainable artificial intelligence (XAI) model.

15. The computer program product of claim 13, wherein the application data includes data associate with one or more selected from a group consisting of:
   artificial intelligence for information technology operations (AIOps);
   event monitoring and ticketing;
   application services;
   application software components;
   incidents, problems and changes (IPC) data; and
   current project data; and
   the infrastructure data includes data associated with one or more selected from a group consisting of:
   architectural documentation and diagrams;
   requests for proposal;
   storage environment and capacity data;
   site information including cloud deployment; and
   investment in hardware, licenses, and development and implementation.

16. The computer program product of claim 13, wherein the program instructions are further executable to:
   generate the assessment of the requirements to the SLO by:
      determining target states of current projects;
      identifying replacement options for the infrastructure;
      comparing service levels for similar categories of infrastructure;
      identifying a deviation between an achieved service level and contracted SLO and determine a dynamic SLA target (DSLT) based on the deviation;
      assigning risk levels to the infrastructure based on a performance analysis;
   availability, and support; and/or
      determining a countermeasure to meet the DSLT.

17. A system comprising:
a processor, a computer readable memory, one or more computer readable storage media, and program instructions collectively stored on the one or more computer readable storage media, the program instructions executable to:
collect data associated with a service level agreement (SLA), the collected data including infrastructure data associated with an infrastructure of the SLA and application data associated with an application of the SLA;
identify relationships between the infrastructure and the application;
identify changes to a technological environment of the SLA based on the collected data and the identified relationships;
establish a baseline existing IT environment for a service level objective (SLO) of the SLA by analyzing the infrastructure data and the application data;
apply requirements to the SLO of the SLA, wherein the requirements include business drivers, technological drivers, and regulatory compliance issues associated with the SLA;
identify a deviation between an achieved service level and a contracted SLO and determine a dynamic SLA target (DSLT) based on the deviation;
determine risk impact to meeting the SLA based on an assessment of the requirements applied to the SLO including a countermeasure to meet the DSLT and assessment of the changes to the technological environment of the SLA, wherein the assessment of the requirements of the SLO includes determining target states of current projects, and identifying replacement options for the infrastructure;
generate a solution option for the SLA utilizing an explainable artificial intelligence (XAI) model based on processing the risk impact with the baseline; and
updated the SLA based on the solution option.

18. The system of claim 17, wherein the countermeasure to meet the DSLT is determined using the XAI model.

19. The system of claim 17, wherein the program instructions are further executable to:
   generate the assessment of the requirements to the SLO by additionally:
      comparing service levels for assigning risk levels to the infrastructure based on a performance analysis, availability, and support.

20. The system of claim 17, wherein the application data includes data associated with one or more selected from a group consisting of:
   artificial intelligence for information technology operations (AIOps);
   event monitoring and ticketing;
   application services;
   application software components;
   incidents, problems and changes (IPC) data; and
   current project data; and
   the infrastructure data includes data associated with one or more selected from a group consisting of:
   architectural documentation and diagrams;
   requests for proposal;
   storage environment and capacity data;
   site information including cloud deployment; and
   investment in hardware, licenses, and development and implementation costs.

* * * * *